(12) United States Patent
Masteller (10) Patent No.: US 6,308,229 B1
(45) Date of Patent: Oct. 23, 2001

(54) SYSTEM FOR FACILITATING INTERFACING BETWEEN MULTIPLE NON-SYNCHRONOUS SYSTEMS UTILIZING AN ASYNCHRONOUS FIFO THAT USES ASYNCHRONOUS LOGIC

(75) Inventor: Steven Robert Masteller, St. Paul, MN (US)

(73) Assignee: Theseus Logic, Inc., St. Paul, MN (US)

(*) Notice: Subject to any disclaimer, the term of this patent is extended or adjusted under 35 U.S.C. 154(b) by 0 days.

(21) Appl. No.: 09/624,336

(22) Filed: Jul. 24, 2000

Related U.S. Application Data (63) Continuation of application No. 09/143,355, filed on Aug. 28, 1998, now Pat. No. 6,128,678.

(51) Int. Cl.[7] .................................................. G06F 13/14
(52) U.S. Cl. ............................. 710/52; 710/70; 710/65; 326/63; 712/36
(58) Field of Search ........................... 710/52, 70, 65; 326/63; 712/36

(56) References Cited

U.S. PATENT DOCUMENTS

| | | |
|---|---|---|
| 5,121,003 | 6/1992 | Williams . |
| 5,212,686 * | 5/1993 | Joy et al. ............................. 370/417 |
| 5,287,305 * | 2/1994 | Yoshida ............................. 365/189.01 |
| 5,305,463 * | 4/1994 | Fant et al. ............................. 712/36 |
| 5,475,680 * | 12/1995 | Turner ............................. 370/412 |
| 5,550,780 * | 8/1996 | Chu ............................. 365/221 |
| 5,640,105 * | 6/1997 | Sobelman et al. ............................. 326/36 |
| 5,652,902 * | 7/1997 | Fant ............................. 364/259.1 |
| 5,656,948 * | 8/1997 | Sobelman et al. ............................. 326/35 |
| 5,764,081 * | 6/1998 | Fant et al. ............................. 326/63 |
| 5,920,899 * | 7/1999 | Chu ............................. 711/169 |
| 5,991,304 * | 11/1999 | Abramson ............................. 370/413 |
| 6,069,514 * | 5/2000 | Fairbanks ............................. 327/292 |
| 6,070,203 * | 5/2000 | Hawkins et al. ............................. 710/57 |
| 6,092,167 * | 7/2000 | Cheung et al. ............................. 711/169 |
| 6,125,438 * | 9/2000 | Okamoto et al. ............................. 712/43 |

OTHER PUBLICATIONS

Mariani, R.; Roncella, R.; Saletti, R.; Terreni, P., "A useful application of CMOS ternary logic to the realisation of asynchronous circuits," IEEE Int'l Symp. on Multiple–Valued Logic, 1997, pp. 203–208.*

Nagata, Y.; Mukaidono, M., "Design of an asynchronous digital system with B–ternary logic," IEEE Int'l Symp. on Multiple–Valued Logic, 1997, pp. 265–271.*

Hanyu, T.; Saito, T.; Kameyama, M., "Asynchronous multiple–valued VLSI system based on dual–rail current–mode differential logic," IEEE Int'l Symp. on Multiple–Valued Logic, 1998, pp. 134–139.*

Brunvand, E., The NSR Processor, 1993, pp. 428–435, 0–8186–1060–3425/93, 1993 IEEE.

Williams, Ted, "Latency and Throughput Tradeoffs in Self-Timed Speed–Independent Pipelines and Rings", Aug. 1990, pp. i–26, Stanford University Technical Report No. CSL–TR–90–431, Stanford University, Stanford, CA, USA.

Sparso et al., "Delay–insensitive multi–ring structures", 1993, pp. 313–340, Integration, the VLSI journal 15 (1993), Elsevier Science Publishers B.V.

(List continued on next page.)

*Primary Examiner*—Thomas Lee
*Assistant Examiner*—Abdelmoniem Elamin
(74) *Attorney, Agent, or Firm*—Steptoe & Johnson LLP (57) ABSTRACT

An asynchronous FIFO using Asynchronous NULL Convention LOGIC (NCL) to facilitate interfacing between multiple non-synchronous systems with a minimum of design and verification. Multiple interfaces, configurations, means for minimizing latency, and capabilities for datastream processing are also incorporated.

16 Claims, 8 Drawing Sheets

OTHER PUBLICATIONS

Tzyh–Yung Wuu, et al., "A Design of a Fast and Area Efficient Multi–Input Muller C–element", pp. 215–218, Jun. 1993, IEEE Transactions on Very Large Scale Integration, (VLSI) Systems, vol. 1, No. 2.

Williams, Ted, "Self–Timed Rings and Their Application to Division", May 1991, pp. i–144, Technical Report: CSL–TR–91–482, Stanford University, Stanford, CA, USA.

Sparso et al., "Design of Delay Insensitive Circuits Using Multi–Ring Structures", European Design Automation Conference, 1992, pp. 15–20, 0–8186–2780–8/92, 1992 IEEE, IEEE Computer Society Press, Los Alamitos, CA, USA.

Unger, Stephen H., Asynchronous Sequential Switching Circuits, 1969, pp. 221–229, Chapter 6, Wiley–Interscience, SBN 471 89632 2, John Willey & Sons, Inc.

Mead et al., "Introduction to VLSI Systems" 1980, pp. 242–262, ISBN 0–201–04358–0, Addison–Wesley Publishing Company, Inc.

Sutherland, Ivan E., "Micropipelines", Communications of the ACM, Jun. 1989, pp. 720–738, vol. 32, No. 6, 1989 ACM 0001–0782/89/0600–0720.

Wojcik et al., "On the Design of Three–Valued Asynchronous Modules", Oct. 1980, pp. 889–898, IEEE Transactions on Computers, vol. C–29, No. 10, 0018–9340/80/1000–0889.

Dean, Mark Edward, "Strip: A Self–Timed Risc Processor", Jul. 1992, pp. 108–114 and Appendix pp. 145–147, E 47, Technical Report No. CSL–TR–92–543, Stanford University, Stanford, CA, USA.

Hampel et al., "Threshold Logic", May 1971, pp. 32–39, IEEE Spectrum.

Brzozowksi et al., "Asynchronous Circuits", 1995, (pp. Contents vii, and xiv–xvi and Index 391–404), Monographs in Computer Science, Springer–Verlag, New York, Inc., New York, NY, USA.

Muller, David E., "Asynchronous Logics and Application to Information Processing", pp. 289–297.

Aiken et al., "Switching Theory in Space Technology" 1963, (pp. Table of Contents ix–x), Stanford University Press, Stanford, CA, USA.

Narinder Pal Singh, "A Design Methodology for Self–Timed Systems", Feb. 1981, pp. 1–98, Massachusetts Institute of Technology, Laboratory for Computer Science, Cambridge MA.

* cited by examiner

SYSTEM FOR FACILITATING INTERFACING BETWEEN MULTIPLE NON-SYNCHRONOUS SYSTEMS UTILIZING AN ASYNCHRONOUS FIFO THAT USES ASYNCHRONOUS LOGIC

This application is a continuation of application Ser. No. 09/143,355, filed Aug. 28, 1998 now U.S. Pat. No. 6,128,678.

FIELD OF THE INVENTION

The present invention relates to the field of electronics, and in particular to asynchronous, First-In-First-Out(FIFO) buffer circuits.

BACKGROUND

Typical electronic logic systems today use clocked Boolean binary logic circuits. Such binary circuits express two values as separate voltages on a single signal line, such as numeric values ZERO and ONE, or logical TRUE and FALSE. Most often, a ground voltage potential represents numeric ZERO or logic FALSE, and a second voltage (e.g., +5 volts) represents numeric ONE or logic TRUE. The most commonly used logic systems perform Boolean logic operations on binary signals, such as AND, OR, and NOT operations. A signal format that uses a single signal line to represent binary values for use with Boolean logic will be referred to here as "Boolean binary" format.

Clocked Boolean logic (CBL) circuits are Boolean logic circuits that use clock signals to regulate the timing of signal processing. For example, a clocked Boolean logic circuit might present input signals to a circuit on the rising edge of a clock, and latch the output of the circuit on the falling edge of the clock. Such use of a clock allows the input signals time to propagate through the circuit, and (if properly designed) ensures that the circuit outputs have settled to final values before sampling the result. Clocks tend be highly regulated to have a fixed frequency (and thus a fixed period), by deriving their periods from a crystal or other oscillator. If the clock period is shorter than signal propagation delay through the circuit, the output might not be valid at the sampling time, and potentially invalid data will be latched.

A First-In-First-Out(FIFO) buffer is a memory circuit characterized by the order in which data may be stored and recovered. Data may be read from a FIFO buffer only in the same order in which it was stored. For example, the first data read from a FIFO buffer is always the first data that was stored (hence the name "first-in-first-out"). A FIFO buffer can also be characterized by two size properties. The width (or "word size") of a FIFO buffer describes the amount of data that can be stored or read at one time. The depth describes the total amount of information that can be stored (often quoted as a number of words).

In clocked FIFO buffers, one or more clock signals regulate the timing of read and write operations, as well as internal operations. When a single clock is used, the input and output rates are identical, and data propagates through the buffer with a fixed delay. Internally, the clock signal regulates movement of data through a series of storage locations so that the contents of all storage locations advance simultaneously. If the clock rate exceeds the maximum operating speed of the internal circuits, an internal storage location might latch a value before receiving new data from a prior location. Furthermore, the circuit associated with a storage location could oscillate or become metastable.

Typically, internal circuitry is designed to operate at conservative clock speeds that allow some margin between the clock period and the worst case delays in the internal circuitry. Such margin avoids certain timing problems, but guarantees that many or all parts of the circuit operate at less than the maximum possible speed.

In other clocked FIFO buffers, separate read and write clocks regulate the writing and reading processes. The read and write clocks determine the read and write data rates, respectively, which may be different. Overflow may occur when an external circuit attempts to write data to a full buffer. Underflow may occur when an external circuit attempts to read data from an empty buffer.

It is relatively simple to build synchronous FIFO buffers for use between two external circuits if both external circuits use the same clock or synchronized clocks. However, FIFO buffers have proven relatively harder to design and control reliably for systems operating in two different and non-synchronous clock domains. Such a FIFO must accommodate (1) irregularities in the availability of data, and (2) differences in the basic clocking systems. Thus, in two-clock FIFO buffer design, the form of clock used within a FIFO and its control logic is an important factor that absorbs substantial design resources and time.

It is desirable to have a complete family of FIFO designs that are readily available, easily scaleable, and do not suffer from timing problems or metastability. It would be possible to maintain a large library of commonly-used and tested FIFO designs for a wide variety of purpose. However, it would be nearly impossible to predict and account for all such uses. Therefore, a new (or modified) design would have to be produced for each application then rigorously tested.

SUMMARY OF THE INVENTION

The invention relates to asynchronous FIFO buffers in which data signals propagate inside the FIFO without regard to system clocks. The FIFO buffer operates at the maximum speed of the physical devices, yet can be easily modified.

The preferred FIFO buffer is particularly useful for interfacing two clocked systems whose clocks are not synchronous with one another. It may be particularly useful for use in an "application specific integrated circuit," (ASIC) chip design, where pre-designed "coreware" subsystems must be integrated in timely and cost effective design cycles. In such applications, design cycle times, technology, lack of readily available design tools (particularly for the newest available technologies), and expense prohibit exhaustive testing and redesign of complex designs.

The disclosed FIFO buffer and interface circuits allow the designer to concentrate on other more important issues of design. The disclosed FIFO system may simplify the base process of complex system design by allowing designers greater flexibility to partition designs into more manageable subsections.

The invention is disclosed in the context of a system having: (1) a first interface circuit that converts clocked binary signals from a first clock domain into asynchronous circuits in a "dual rail" signal format with NULL signals; (2) a series of asynchronous storage registers; and (3) a second interface circuit that converts signals from the dual rail format with NULL into clocked binary signals in a second clock domain. The asynchronous storage registers operate asynchronous from either clock domain.

BRIEF DESCRIPTION OF THE DRAWINGS

The invention will be described below in reference to the attached drawings in which.

DESCRIPTION OF THE PREFERRED EMBODIMENTS

Asynchronous circuits have been proposed that are intended to operate without a clock. One asynchronous logic paradigm is disclosed in U.S. Pat. No. 5,305,463 ("the '463 logic system") which is incorporated herein by reference in its entirety. Several data representations are discussed, but in one representation, a signal may assume a DATA value or a NULL value. A DATA value, for example might be a numeric value ZERO or ONE, or a logic value TRUE or FALSE, or another meaning not related to binary or Boolean logic representations.

In such a representation, a binary signal may take the form of two signal lines, with a first signal line designated to mean ZERO or FALSE, and the second signal line designated to mean ONE or TRUE. The pair of lines together represents a single binary variable (such as a single bit of binary data) and have four possible states: (1) DATA,DATA; (2) DATA, NULL; (3) NULL,DATA, (4) NULL,NULL. The first state (DATA/DATA) is not permitted. The second state (DATA, NULL) signifies that the variable has assumed the value ZERO (or FALSE). The third state (NULL, DATA) signifies that the variable has assumed the value ONE (or TRUE). The fourth state (NULL, NULL) lacks meaning, but can be thought of as indicating that the variable has not assumed a meaningful value.

In certain embodiments of the '463 logic system, signals cycle between NULL and DATA values at rates determined primarily by (1) the availability of complete data and (2) the switching speeds of the underlying physical devices. Periods of NULL separate periods of DATA, thus differentiating between different time values of the signals. Fixed-period clocks are not used to regulate the presentation of input signals to a circuit or to regulate the latching of output signals.

The preferred embodiments of the invention described herein represent certain binary variables as asynchronous, dual rail signals with periods of NULL separating periods of DATA. Such a representation will be referred to as "dual rail with NULL" or "DRN."

The '463 logic system may be implemented with threshold gate logic elements. U.S. Pat. No. 5,640,105 ("the '105 patent") and U.S. Pat. No. 5,656,948 ("the '948 patent") describe a number of implementations of threshold gates and are incorporated herein by reference in their entirety. Such gates can be characterized as having varying numbers of inputs and varying threshold values. Gates switched their outputs from NULL to DATA states when a threshold number of inputs are in the DATA state. Furthermore, such gates return their output to the NULL state only when all inputs return to NULL. Certain FIFO buffer structures disclosed herein may utilize elements of the '463 logic system and gates of the '105 and '948 patents.

System Overview

Figure 2:
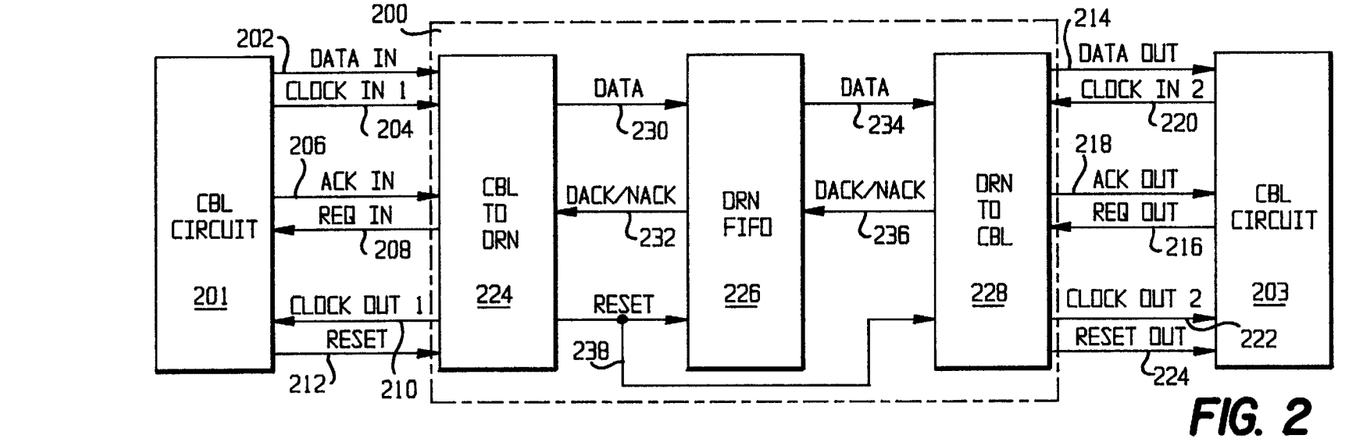
FIG. 2 illustrates a block diagram of an interface system transferring data from a first clock domain to a second clock domain.

FIG. 2 illustrates inputs and outputs of a circuit for transferring data between two separate clocked domains.

The circuit 200 receives eight bits of binary digital data on signal lines 202 in Boolean binary format from an upstream CBL circuit 201. The upstream CBL circuit 201 provides a clock signal CLOCKIN1 on signal line 204 that is synchronous with the clock domain of the upstream CBL circuit 201. The circuit 200 also provides a protocol signal REQIN on signal line 208 and receives an acknowledge signal ACKIN on signal line 206. The circuit 200 requests data transfer using the REQIN signal on line 208, and the upstream CBL circuit 201 acknowledges the request using the ACKIN signal on line 206. Other interface handshaking protocols as are known in the prior art are possible. The circuit 200 also includes a RESET input on line 212. A CLOCKOUT1 output on line 210 can be used in an alternate data transfer protocol to the one using ACKIN and REQIN signal lines 206, 208 as discussed more fully below with reference to FIGS. 3b and 4b.

The circuit 200 provides data in Boolean binary format on signal lines 214 to a downstream CBL circuit 203. The downstream CBL circuit 203 provides a clock signal CLOCKIN2 on signal line 220 that is synchronous with the clock domain of the downstream CBL circuit 203. The circuit 200 also provides a protocol signal ACKOUT on signal lines 218 and receives a protocol signal REQOUT on signal line 216. The downstream CBL circuit 203 requests data transfer using the REQOUT signal on line 216, and the circuit 200 acknowledges the request using the ACKOUT signal on line 218. The circuit 200 also provides a CLOCKOUT2 output on line 222 that can be used as an alternate data transfer protocol to the one using REQOUT and ACKOUT signal lines 216, 218 as discussed more fully below with reference to FIGS. 3a and 4a.

Internally, the circuit 200 includes a CBL to DRN interface circuit 228, an asynchronous DRN FIFO 226, and a DRN to CBL interface circuit 228. The CBL to DRN interface circuit 228 converts Boolean binary format signals to dual rail with NULL format signals and transfers the data over data lines 230 to the DRN FIFO 226 under control of a single DACK/NACK signal on signal line 232. The DRN FIFO 226 provides first-in-first-out storage capacity, and transfers the data over signal lines 234 to DRN to CBL interface circuit 228 under control of a DACK/NACK signal on signal line 236.

Core DRN FIFO

Figure 1A:
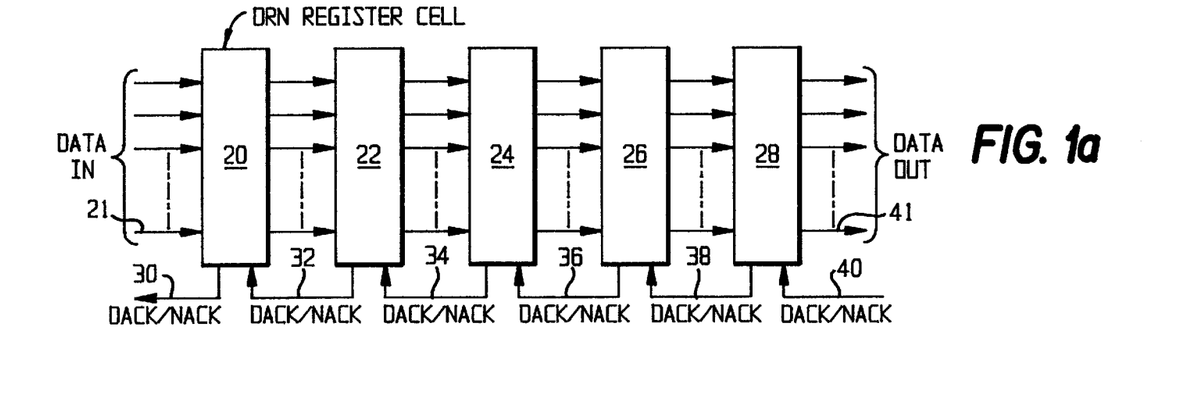
FIG. 1a illustrates a central asynchronous logic FIFO buffer structure.

FIG. 1a illustrates details of the DRN FIFO 226 of FIG. 2. It is a series of asynchronous registers 20, 22, 24, 26, 28. Asynchronous registers may be of a type described in U.S. Pat. No. 5,5652,902 ("the '902 patent"), which is incorporated here by reference in its entirety. FIG. 1a shows five asynchronous registers 20, 22, 24, 26, 28, however, different numbers and widths can be included to provide a desired capacity.

The first asynchronous register 20 receives on lines 21 data to be stored from CBL to DRN interface circuit 224 (FIG. 2). Data is expressed in dual rail with NULL format.

Data propagates sequentially through each of the intermediate asynchronous registers 22, 24, 26, 26, to the last asynchronous register 28. The last asynchronous register 28 outputs data on lines 41 in dual rail with NULL format to a downstream interface circuit 228 (not shown).

Each asynchronous register 20, 22, 24, 26, 28 locally propagates DATA and NULL wavefronts using DATA-acknowledge/NULL-acknowledge ("DACK/NACK") signals 30, 32, 34, 36, 38, 40, so that alternating wavefronts of NULL and DATA will cascade through the register stages. A DACK/NACK signal received at an asynchronous register from a downstream circuit (i.e., one that will receive the output from the asynchronous register) indicates whether the downstream circuit is ready to accept a DATA or NULL wavefront. For example, a DACK/NACK signal may assume a first value that indicates that the downstream circuit has received DATA and is ready to receive NULL, while a second state indicates that the downstream circuit has received NULL and is ready to receive DATA. Similarly, an asynchronous register generates a DACK/NACK signal to indicate its own state to an upstream circuit (i.e., one that will provide data).

For the purpose of illustration, the operation will be described with asynchronous registers 20, 22, 24, 26, 28 initially storing NULL. The downstream DRN to CBL interface circuit 228 (FIG. 2) will be assumed to be not ready to accept DATA, and will not communicate readiness to accept data on DACK/NACK signal line 40.

All asynchronous registers will initially signal to their immediately upstream asynchronous register (or in the case of the first asynchronous register 20, to the upstream interface circuit 224), that they are ready to receive DATA. The last asynchronous register 28 receives a DACK/NACK signal on signal line 40 that the downstream DRN to CBL circuit 228 (FIG. 2) is not ready to accept data.

When the upstream CBL to DRN circuit 224 (FIG. 2) presents DATA (and with the second asynchronous register 22 signaling readiness to receive DATA), the first asynchronous register stores the DATA, immediately presents it to the downstream asynchronous register 22, and signals on DACK/NACK signal line 30 that the first asynchronous register is ready to receive NULL. The second asynchronous register 22 similarly stores the DATA, immediately presents it to the third asynchronous register 24, and signals to the first asynchronous register 20 on DACK/NACK signal line 32 that the second asynchronous register 22 is ready to receive NULL. The DATA similarly cascades all the way to the last asynchronous register 28. The last asynchronous register 28 now stores DATA, and all upstream registers store DATA.

After the first asynchronous register 30 has stored DATA and signaled readiness to accept NULL, the upstream CBL to DRN interface circuit 224 (FIG. 2) presents NULL. With the second asynchronous register signaling readiness to accept NULL, the first asynchronous register 20 stores NULL, immediately presents it to the second asynchronous register 24, and switches its DACK/NACK signal line 30 to indicate readiness to receive more DATA. A wave of NULL cascades through the asynchronous registers in a complementary manner as discussed above for DATA, except that the NULL wave stops at the fourth asynchronous register 26 (because the downstream circuits are not ready to accept the next waves of NULL and DATA). The process repeats as long as the upstream CBL to DRN circuit 224 (FIG. 2) has DATA to deliver, and as long as the downstream DRN to CBL circuit 228 (FIG. 2) is not ready to receive DATA.

For the purpose of illustration, it will be assumed that the asynchronous registers fill up until the first, third, and last asynchronous registers 20, 24, 28 hold NULL, while the second and fourth asynchronous registers 22, 26 hold DATA. The first, third, and last asynchronous registers (which hold DATA) will continue to signal readiness to accept NULL, because their respective downstream circuits are not yet ready to receive DATA. Similarly, the second and fourth asynchronous registers 22, 26 (which hold NULL) will continue to signal readiness to accept DATA, because their respective downstream circuits are not yet ready to receive NULL. The circuit will not accept any more data.

When the downstream DRN to CBL circuit 228 (FIG. 2) signals on DACK/NACK signal line 40 its readiness to receive DATA, the last asynchronous register 28 will store DATA presented from the second-to-last asynchronous register 26, and switch its DACK/NACK signal line 38 to indicate that the last asynchronous register 28 is ready to receive NULL. The second-to-last asynchronous register will store NULL presented from the third asynchronous register 24 and switch its DACK/NACK signal line 36 to indicate that it is ready to receive DATA. The contents of each register 20, 22, 24, 26, 28 will shift down, while still maintaining NULL between DATA. The first asynchronous register 20 will then indicate readiness to accept DATA from the upstream CBL to DRN circuit 224 (FIG. 2).

Figure 1B:
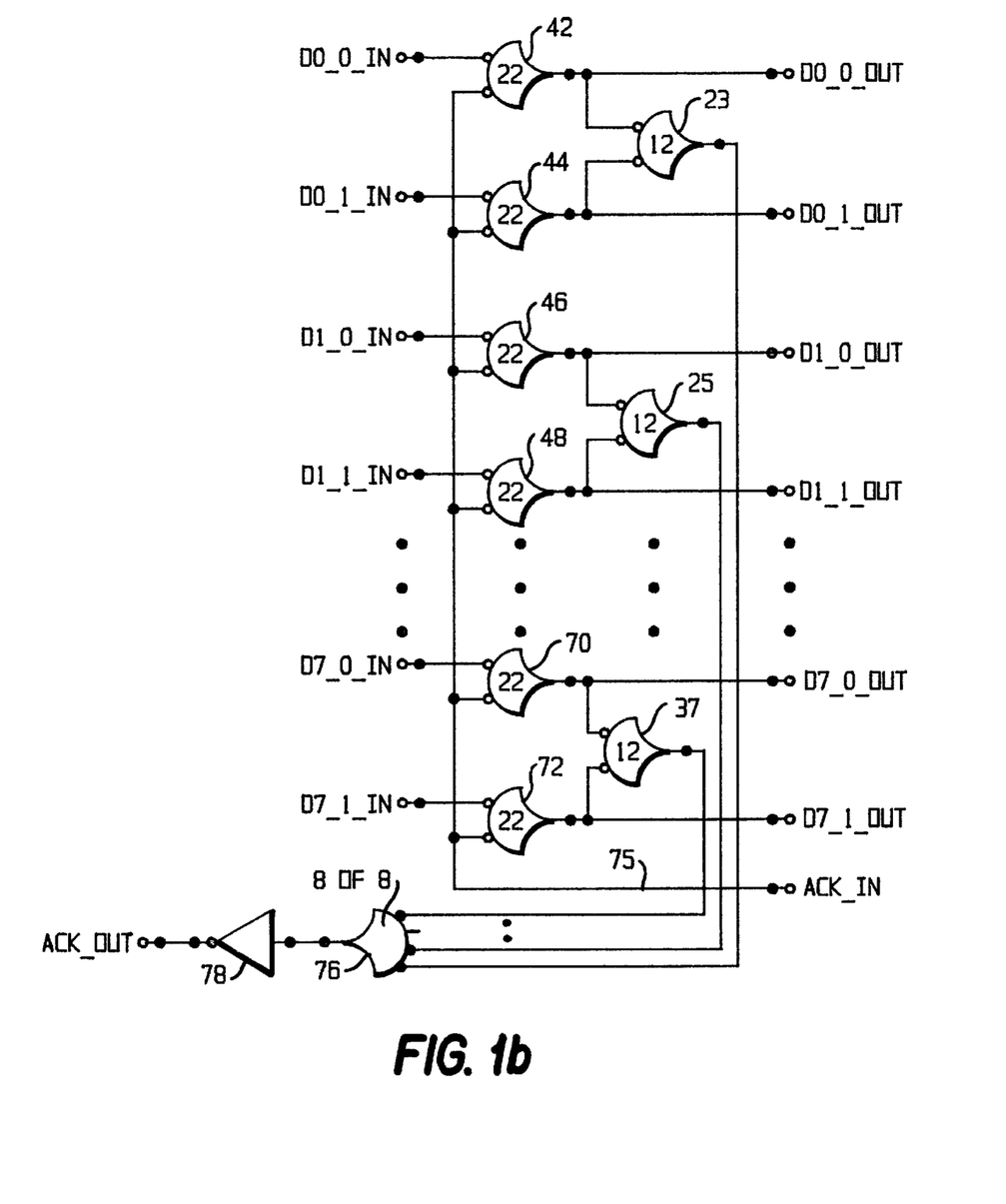
FIG. 1b illustrates an asynchronous logic register cell.

FIG. 1*b* illustrates a cell of an asynchronous register. signal lines D0_0_In, D0_1_In, D1_0_In, D1_1_In, . . . D7_0_In, D7_1_In carry signals from an upstream circuit (not shown). Signal lines D0_0_Out, D0_1_Out, D1_0_Out, D0_1_Out, . . . D7_0_Out, D7_1_Out carry signals to a downstream circuit (not shown). The ACK_IN 75 signal line carries a DACK/NACK signal from a downstream circuit (not shown). Signal line ACK_OUT carries a DACK/NACK signal to an upstream circuit (not shown).

Gates 42, 44, 46, 48, . . . 70, 72 are threshold gates. The labels "22" inscribed in those threshold gate symbols signify that each gate has two inputs and a threshold of two (also known as a 2 of 2 threshold gate). That is, the output of a "22" gate will switch from NULL to DATA when two of the two inputs are DATA. Gates 23, 25, . . . 37 are also threshold gates. The labels "12" inscribed in those threshold gate symbols signify that each gate has two inputs and a threshold of one (also known as a 1 of 2 threshold gate). That is, the output of a "12" gate will switch from NULL to DATA when one of the two inputs are DATA. Both the "22" and "12" gates also exhibit hysteresis, so that the output will remain DATA until both inputs return to NULL.

FIG. 1*b* shows sixteen "22" gates 42, 44, 46, 48, . . . 70, 72 and eight "12" gates 23, 25, . . . 37 for illustration purposes. In this figure, two "22" gates are used to carry dual rail signals for each single bit of binary data in an eight-bit data word; hence the signal naming convention Dx_0_, Dx_1_, to denote the dual rail pairings in the figure. A single "12" gate 23, 25, . . . 37 is used for each dual rail "22" gate pair to provide data acknowledge detection for the dual rail signal. Additional gates can be added to provide more width to the register. Examples of transistor diagrams for threshold gates can be found in the '948 patent.

The hysteresis characteristic of threshold gates 42, 44, 46, 48, . . . 70, 72 provides a memory capability. As long as a downstream circuit holds a DATA level signal on ACK_IN line 75, the gates 42, 44, 46, 48, . . . 70, 72 will hold a previously-set DATA state, even if the inputs D0_0_In, D0_1_In, D1_0_In, D1_1_In, . . . D7_0_In, D7_1_In return to NULL.

Gate 76 is a threshold gate. The label "88" signifies that it has eight inputs and a threshold of eight. It collects the individual bit acknowledge signals of the data acknowledge detection gates 23, 25, . . . 37 and provides a single acknowledge signal when all are DATA to the upstream DRN circuit. The combination of "88" gate 76 and "12" gates 22, 24, . . . 36 serves as a "watcher" circuit. It senses the states of all output signal lines D0_0_Out, D0_1_Out, D1_0_Out, D1_1_Out, . . . D7_0_Out, D7_1_Out and indicates that one of each of the eight pairs of threshold gates 42, 44, 46, 48 . . . 70, 72 have achieved a DATA state, or that all sixteen of gates 42, 44, 46, 48, . . . 70, 72 have achieved a NULL state. (Depending on the cell width, the number of "12" gates and the inputs and the threshold of Gate 76 can be changed.)

Gate 78 is an inverting gate that outputs a NULL level when its input is DATA and vice versa. It inverts the output of gate 76 so that next DATA or NULL wave is properly requested from the upstream circuitry (a NULL output is a request for NULL from the upstream circuitry, a DATA level output is a request for DATA).

DRN to CBL Interface

The DRN logic signals described above propagate alternating waves of NULL and DATA through their circuitry. Clocked Boolean Logic does not have this same characteristic. When using a DRN FIFO buffer of the type disclosed above, the CBL to DRN interface circuit 224 (FIG. 2) must insert the NULL wave, and the DRN to CBL circuit 228 (FIG. 2) must remove the NULL wave. Alternatively, the NULL wave could be present in the data stream already. However, such a solution adds either software or hardware overhead elsewhere in the non-DRN system.

To facilitate interfacing a clocked Boolean circuit must be able to request data from a NULL wave system and then wait for it. Similarly, a clocked Boolean circuit must wait for a DATA-Acknowledge/Null-Acknowledge before transferring DATA to it.

Figure 3A:
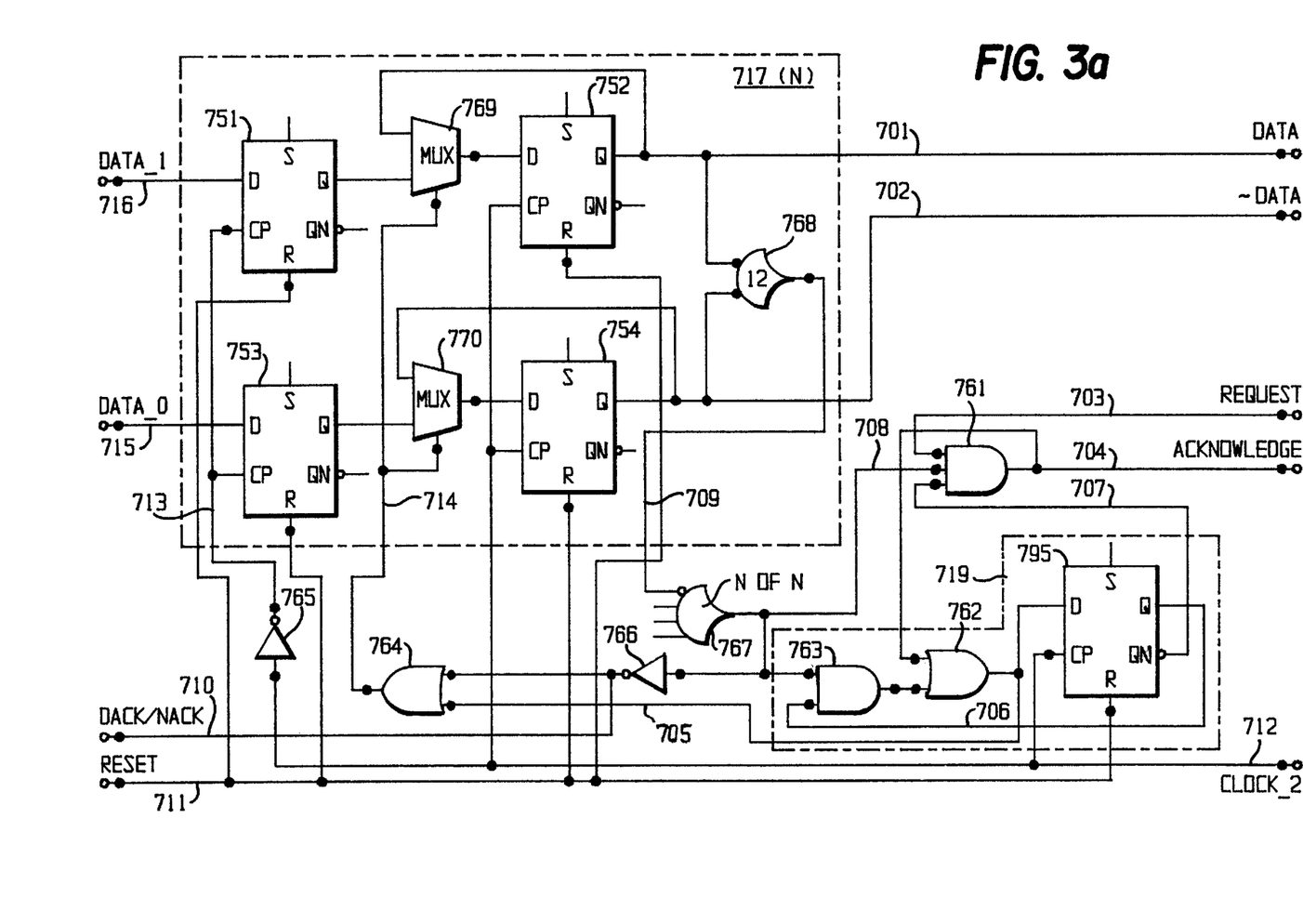
FIG. 3a illustrates a circuit for converting from asynchronous, dual rail logic with NULL to clocked Boolean Logic.

FIG. 3a illustrates details of a first DRN to CBL interface 717 which can be used as the DRN to CBL interface circuit 228 of FIG. 2. FIG. 3a uses a number of well-known graphic symbols for Boolean logic elements, such as AND gates 763, 761, OR gates, 762, 764, latches 751, 752, 753, 754, multiplexers 769, 770, and inverters 765, 766. FIG. 3a also includes a number of threshold gates 767, 768.

The interface 717 illustrated details of circuits for transferring a single, binary-value signal, such as a binary bit (ZERO or ONE) or a binary logic signal (TRUE or FALSE). The Data signal on line 701 is a single signal line carrying a Boolean binary format representation of a single binary bit. The ground voltage state represents binary ZERO, and a supply voltage state represents binary ONE. The ~Data signal line 702 is an inverted form of the Data signal line 701.

The circuit 717 receives a DRN representation of a single binary bit on two signal lines 716, 715, each having two voltage states. The first line 716 is assigned a meaning of "ONE," and the second line 715 is assigned a meaning of "ZERO." On the first line 716, a supply voltage expresses the meaning of the line, while the ground voltage does not express the meaning of the line, which is the state called NULL. The two lines together carry a single binary bit of information. When the Data_0 line 716 is at the supply voltage and the Data_1 line 715 is at the ground voltage, the two lines together signify a binary ZERO. When the Data_1 715 is at the supply level and the Data_0 line 716 is at the ground level, the two lines together signify a binary ONE. When both lines 715, 716 are at the ground level, the signal has no meaning and are in the NULL state. It is not permitted for both lines to be at supply level at the same time.

The interface circuit 717 connects to an upstream DRN circuit, such as the DRN FIFO 226 of FIG. 2, and to a downstream Boolean circuit, such as the CBL circuit 203. (FIG. 2). The DACK/NACK signal line 710 signifies to an upstream asynchronous circuit that the interface circuit 717 is ready to receive the next DATA or NULL wavefront.

The Clock_2 signal line 712 is a system clock from a downstream Boolean circuit (not shown). The Request signal line 703 and the Acknowledge signal line 704 are used in a protocol to transfer data to a downstream Boolean circuit. The Request signal line 703, when high, indicates that the downstream Boolean circuit is ready to receive new data. The Acknowledge signal line 704, when high, indicates that the interface circuit has data ready to be transferred.

The interface circuit 717 shown in FIG. 3a illustrates details of circuitry for converting a single bit of binary information from DRN to CBL format. Input signal lines 715, 716 carry the information as alternating wavefronts of NULL and DATA. The binary output signal Data on signal line 701 is derived from the DATA_1 input on signal line 716. Subject to timing considerations of passing data through latches 751, 752 as discussed below, when DATA_1 becomes meaningful (supply voltage level), the DATA output line 701 will assume the supply voltage level, signifying binary numeral ONE. When DATA_0 becomes meaningful (supply voltage level) and DATA_1 is NULL (ground voltage level), the DATA output line 701 will assume the ground voltage, signifying binary numeral ZERO. The ~DATA line 702 operates in an identical manner, but is based on the DATA_0 input line 715, and produces a result that is inverted relative to the DATA line 701.

The interface circuit 717 stores the data received on signal lines 715, 716, in latches 751 and 753 on the next negative-going transition of the Clock_2 signal line 712. These latches 715, 716 prevent metastability under certain circumstances and may be omitted without destroying the utility of the circuit. The following positive-going transition of Clock_2 clocks the data into latches 752 and 754.

The interface circuit 717 accepts requests for data from a downstream CBL circuit (not shown) on request signal line 703, and issues an acknowledge signal on acknowledge signal line 704 when data is ready. Data is sent out to the clocked Boolean circuit on the DATA line 701 at the same time as the Acknowledge signal, both of which transition in synchrony with the local clock signal, Clock_2 on line 712. Signal line 702 is the inverted, negative-logic version of line 701 and may be used instead of signals on line 701 by the downstream circuitry if negative logic is desired.

The interface circuit 717 requests data from the upstream DRN circuit (not shown) on DACK/NACK signal line 710 after transferring and emptying information from latch 752 (and/or latch 754). The interface circuit 717 accepts the next data wavefront on signal lines 716 and 715 (Data_0 and Data_1). The data will be stored and made ready for transfer to the downstream CBL logic circuit upon request.

When a data request signal from the downstream CBL circuit arrives on signal line 703, it causes AND gate 761 to generate an acknowledge signal on signal line 704 if data is ready for transfer from latches 752 and 754. If no data is ready in latches 752 and 754, a low signal from threshold gate 767 blocks the request until data is ready. After AND gate 761 generates an (active high) acknowledge signal, a latch 755 in hold circuit 719 turns off the acknowledge signal (returns it to a low level) on the next cycle of Clock_2 by sending a low signal on line 707 to AND gate 761.

The hold circuit 719 also includes OR gate 762 and AND gate 763. The output of OR gate 762 also passes through OR gate 764 to the control inputs of multiplexers 769, 770. Multiplexers 769, 770 selectively connect the inputs of latches 752, 754 either to their own respective outputs or to incoming data received through latches 753, 751. Thus, when the Acknowledge signal on line 704 is high or hold circuit 719 is active, and multiplexers 769, 770 are enabled to pass data wavefronts from latches 751, 752 into latches 752, 754.

When latches 752, 754 hold meaningful data from the upstream DRN circuitry, one will hold a DATA value, and the other will hold a NULL value. The output of threshold gate 768 will be asserted (i.e., not NULL). In contrast, when latches 752, 754 both hold NULL values, the output of threshold gate 768 will be NULL. When the interface circuit has been expanded to contain multiple replicas of the data-handling circuits 717, the outputs from corresponding threshold gates 768 from all replicas are collected as inputs to threshold gate 767.

Threshold gate 767 will generate an output on line 708 that performs several functions. First, it forms the basis for a DACK/NACK signal on line 710 (after being inverted by inverter 766). The DACK/NACK signal indicates to upstream circuitry whether the latches 752, 754 hold NULL or meaningful data, which signals that the upstream circuit can now send a complementary waveform (DATA if the latches hold NULL, or NULL if the latches hold DATA). A transition to high on signal line 708 switches the output of inverter 766 from high to low, which in turn converts the DACK/NACK signal from a "request for data" into a "request for NULL."

Second, threshold gate 767 provides a control signal for multiplexers 769, 770. A low signal from inverter 766 (passing through OR gate 764) sets multiplexers 769 and 770 to re-circulate data from the outputs of latches 752 and 754 to their respective inputs. Thus holding the data over multiple clock cycles until needed by the downstream CBL circuitry.

Third, threshold gate 767 provides an input to hold circuit 719. When NULL, the output of threshold gate 767 resets the hold circuit 719 by clocking a low level into latch 795. When NULL, it also switches multiplexers 770 and 769 to pass new data from latches 751, 753 to latches 752, 754.

The Reset signal line 711 resets all flip flops 751, 752, 753, 754, 755 of the interface. Upon power up or reset, the interface circuit 717 of FIG. 3a does not service requests for data from a downstream CBL circuit until data flows through from the upstream DRN circuit. Similarly, after servicing a first request for data, the interface circuit 717 will not service a second data request from a downstream CBL circuit until it receives new data. This characteristic prevents data overflow and underflow.

More specifically, an active (high) signal on the Reset line 711 resets all latches 751, 752, 753, 754 placing a logic low on all their "Q" outputs. Signal lines 701 and 702 assume low or ZERO levels. Threshold gate 768 changes its output to NULL, which forces the output of AND gate 761 low and prevents it from providing an affirmative acknowledge signal 704 to the downstream clocked Boolean circuit. Inverter 766 inverts the NULL level on signal line 708 to provide the "request for data" signal to the upstream circuit on signal line 710, and (through OR gate 764) switches the multiplexers 770, 769 to pass data from the upstream circuit. The interface circuit 717 then waits for more data from the upstream circuit and does not respond to data requests from the downstream circuit until threshold gate 768 senses the arrival of data in latch 752, 754.

The circuit of FIG. 3a illustrates a transfer of a single bit of data. It can be expanded in width to transfer multiple bits simultaneously, such as for 8-bit, 16-bit, 32-bit or larger data words, by replicating the data-carrying circuitry 717. In addition, all outputs of replicas of threshold gate 768 should be made inputs to the single threshold gate 767, and the threshold of the gate 767 should be increased according to the number of inputs.

Figure 4A:
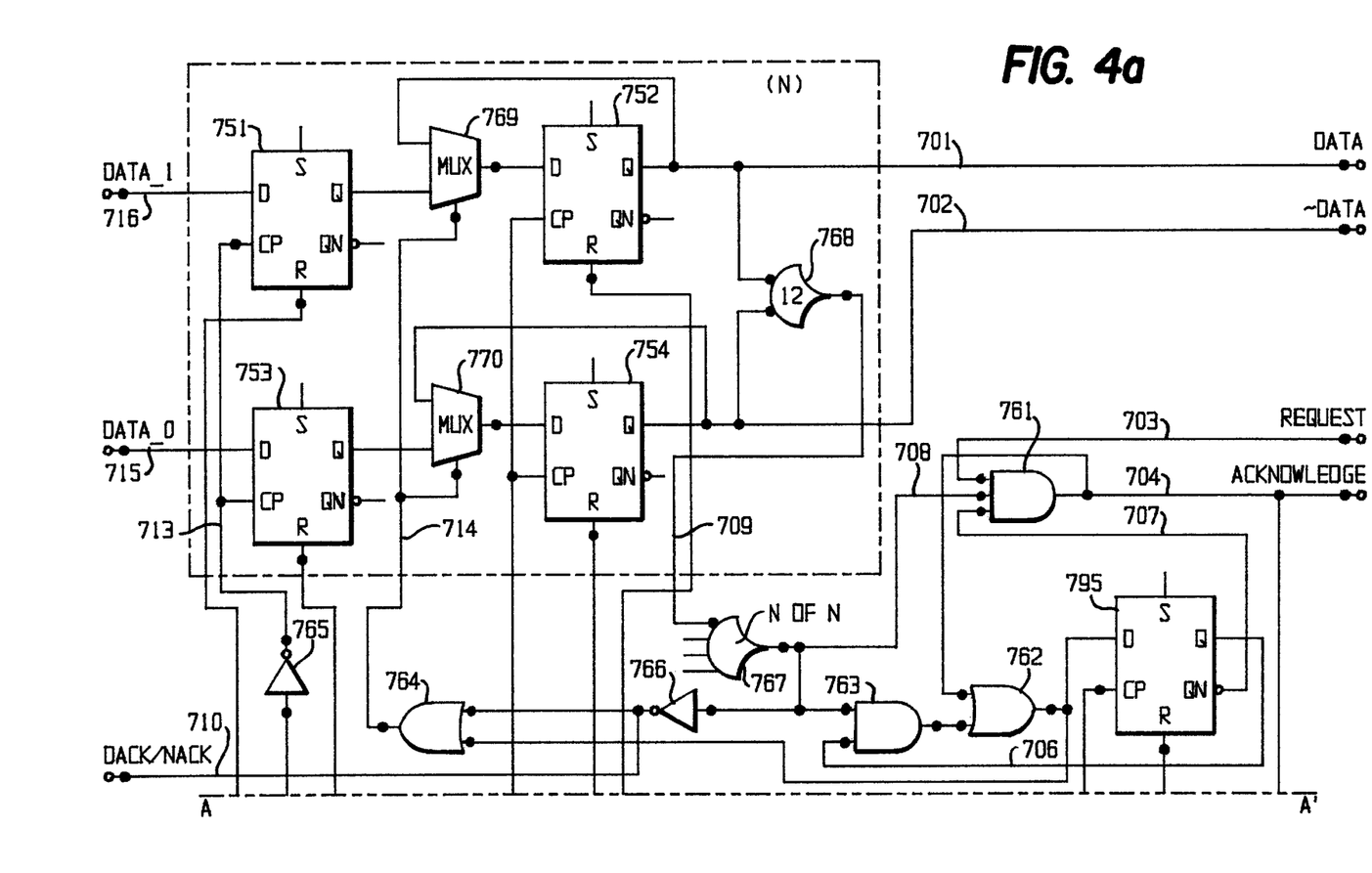
FIGS. 4a and 4b illustrates the circuit of FIG. 3a modified with gated clock and synchronous reset sub-circuits.

FIG. 4a illustrates the circuit of FIG. 3a but modified with two additional features: 1) a synchronous reset capability, and 2) a gated clock for use as an alternative protocol for transferring clocked data to a clocked Boolean circuit. Circuit elements that are the same in FIGS. 3a and 4a have the same reference numerals.

With regard to the synchronous reset feature, the external Reset signal from line 711 passes through the data inputs of two series connected latches 757, 758 that are clocked by the Clock_2 signal from line 712. The external Reset line 711 also connects to the SET inputs of latches 757, 758. When the external Reset line 711 is active (high), it immediately sets both latches 758, 757, which in turn drives internal reset line 773 to clear latches 751, 752, 753, 754, 755, 765. When the external Reset line is no longer active, the previously-set latches 757, 758 maintain the internal reset line active for at least one clock cycle of the Clock_2 signal on line 712, which isolates any potential metastability problems associated with the asynchronous external reset. This local reset may also be passed on and used to reset other circuitry.

With regard to the gated clock feature, the Clock_2 signal from signal line 712 via inverter 773 clocks the Acknowledge signal from AND gate 761 into latch 756 on the falling clock edge to help avoid race conditions with subsequent AND gate 771. The output of latch 756 in turn connects to an input of AND gate 771, which also receives Clock_2 as an input. The output of latch 756 thus gates the Clock_2 signal so that transitions of the Clock_2 signal only appear on Clock_2_Gated line 772 when the acknowledge signal indicates the readiness of data for transfer from latches 752, 754.

The gated clock signal on line 772 can serve as an alternative handshaking protocol to the above-described request/acknowledge handshaking. The circuit provides a clock (Clock_2_Gated) to a downstream clocked Boolean circuit only when actively transferring data. The downstream circuit may stop the clock after receiving the data by dropping the Request signal line 703 LOW.

CBL to DRN Interface

Figure 3B:
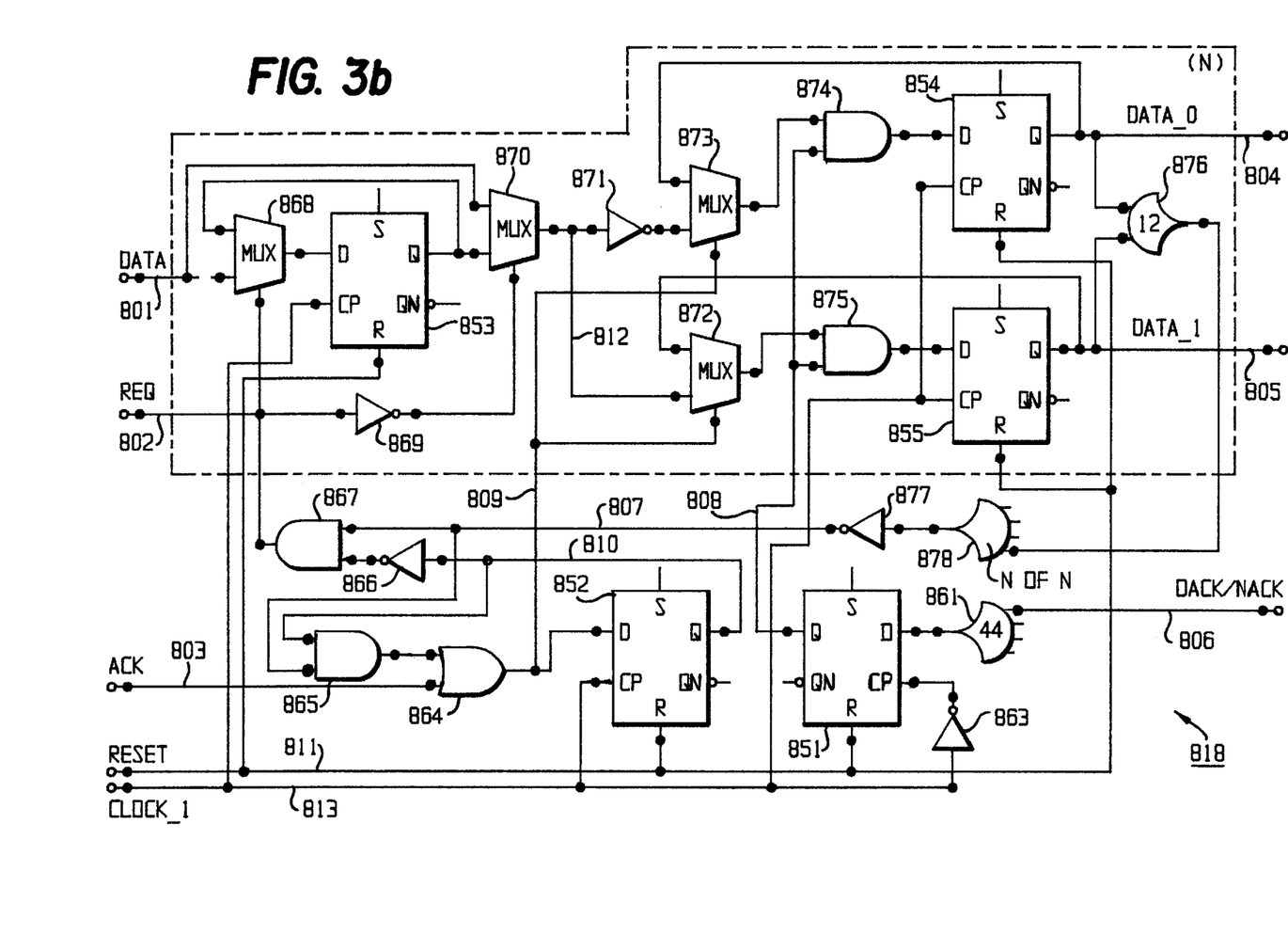
FIG. 3b illustrates a circuit for converting from clocked Boolean logic to asynchronous, dual rail logic with NULL.

FIG. 3b illustrates a circuit 818 that may be used as the CBL to DRN interface circuit 224 (FIG. 2). A CBL circuit provides a Data signal in binary format on line 801, and also provides a Clock_1 signal on line 813. Reset line 811 is an input for resetting the circuit. The interface circuit 818 provides DATA and NULL signals in DRN format to a downstream asynchronous circuit on Data_0 and Data_1 signal lines 804, 805. Acknowledge and Request lines 803, 802 coordinate data flow between the interface circuit and the upstream CBL circuit. A DACK/NACK signal on signal line 806 coordinates data flow to the downstream DRN circuit.

Data format conversion from Boolean binary format to a DRN format involves latches 853, 854, 855. The interface circuit 818 stores binary data received on line 801 in latch 853, where a ground level voltage signifies a binary ZERO, and a supply level voltage signifies a binary ONE. The data output of latch 853 passes through one input of multiplexer 870 and then splits along two paths. One path passes through inverter 871, multiplexer 873 and AND gate 874 to the data input of latch 854. The second path passes through multiplexer 872 and AND gate 875 to the data input of latch 855. At latches 854, 855, ground voltage levels signify NULL, and supply voltage levels signify DATA. More specifically, a DATA level at latch 854 signifies a numeric value ZERO (or logic value FALSE), and a DATA level at latch 855 signifies a numeric value ONE (or a logic value TRUE).

The interface circuit 818 requests data from an upstream CBL circuit by setting Request line 802 to HIGH. The HIGH Request level on line 802 also prepares the interface circuit 818 to receive data by switching multiplexer 868 to connect data line 801 to the data input of latch 853. The Request signal on line 802 also passes through inverter 869 to switch multiplexer 870 to connect the output of latch 853 to the split data paths of line 812. (One path leads through inverter 871 to multiplexer 873, the other path leads directly to multiplexer 872.)

The upstream circuit responds to a HIGH level on Request line 802 by setting Acknowledge line 803 to HIGH and placing new data on signal line 801. Latch 853 stores the data from the CBL circuit on the next positive-going transition of the Clock_1 transfer clock on line 813.

The HIGH Acknowledge level on line 803 passes immediately through OR gate 864 and signal line 809 to multiplexers 873, 872, causing each to connect one of the two split data paths to one of two AND gates 874, 875. (This prepares the interface circuit 818 to deliver data to the downstream circuit as discussed more fully below).

The High Acknowledge level on line 803 also passes through OR gate 864 and is stored in latch 852 on the same clock transition that data is stored into latch 853. The HIGH level then appears on the output of latch 852 and passes through signal net 810. Inverter 866 receives the HIGH signal from net 810, inverts it, and disables AND gate 867, thereby resetting the Request line 802 to a LOW level and canceling the previous request for data. The resetting of the Request line 802 triggers a reconfiguration of the interface circuit 818 to deliver data to a downstream circuit. The LOW level on line 802 also switches multiplexer 868 to re-circulate previously-stored data back into latch 853 on subsequent cycles of the clock on line 813, thus blocking receipt of additional data until after transmitting previously-received data. The signal path that passes from the output of the latch 852 back to its own input (via AND gate 865 and OR gate 464) returns the HIGH level, thus maintaining the stored HIGH level during subsequent cycles of the clock on line 813. As mentioned above, with the new data having been latched in from the upstream CBL circuit, multiplexers 873 and 872 are set to stop re-circulating current data, and to pass new data forward from signal line 812.

A DRN circuit (such as the DRN FIFO of FIG. 2) requests DATA by setting DACK/NACK line 806 to DATA. If the data fans out to multiple downstream DRN circuits, threshold gate 861 collects DACK/NACK signals from all of them, and delivers a single request to the input of latch 851 when all downstream circuits have signaled for the data. (Gate 861 is shown with four inputs and a threshold of four, which assumes four downstream circuits in this example.) Latch 851 stores this signal on the next negative-going transition on clock line 813, which isolates metastability from the latches 854, 855.

A HIGH (or DATA) level output from latch 851 on signal line 808 enables AND gates 874, 875 to pass DATA to latches 854, 855, which store DATA on the next rising transition of the clock on signal line 813. One of the two latches 854, 855 stores a ground voltage level, which corresponds to a NULL signal for the downstream circuit, while the other stores a supply voltage level, which corresponds to a DATA signal.

The latches 854, 855 place their stored levels on their respective output lines 804, 805. Threshold gate 876 detects the presence of DATA on output lines 804, 805 and generates a supply level (DATA) signal that propagates through threshold gate 878 and inverter 877 to become a low level on line 807. The low value appears at the input to AND gate 867 and cancels the previous data request on line 802. The low level also appears at the input to AND gate 865 and clears (stores a low level in) latch 852. The clearing of latch 852 in turn sets multiplexers 872 and 873 to re-circulate data into the latches 854, 855, thus holding the DATA. The clearing of latch 852 also sets multiplexers 868, 870 to pass new data from the upstream circuit to latch 853. Thus, when the interface presents data to the downstream circuit on lines 804, 805, it immediately enables itself to request and receive new data from the upstream circuit.

The downstream DRN circuit(s) will store the DATA upon receiving it from lines 804, 805. After storing DATA, the downstream DRN circuit(s) will request a wavefront of NULL by setting DACK/NACK signal line 806 to NULL. When all downstream circuits request NULL, threshold gate 861 outputs a LOW signal. Latch 851 loads the LOW signal on the next negative-going transition on clock line 813, which isolates metastability problems from the latches 854, 855. The LOW output from latch 851 in turn reaches AND gates 875, 875 and forces their outputs to LOW. Latches 854, 855 store these LOW level signals on the next rising transition on clock line 813, and thus present LOW on both output lines 804, 805, which corresponds to generating a NULL wavefront. Threshold gate 876 senses the NULL wavefront on signal lines 804 and 805 and generates a NULL (low) output. Threshold gate 878 in turn generates a low output, which inverter 877 converts to high on line 807. The high level of line 807 enables AND gate 867 to request new data from the upstream circuit. One data transfer is thus complete.

A high signal on Reset line 811 can be used to reset latches 851, 852, 853, 854, and 855 into a known states (storing low levels) that correspond to holding no data. Threshold gate 867 senses the presence of NULL on output signal lines 804, 805 and generates NULL. Gate 878 in turn collects the separate gate 867 signals and generates NULL, and inverter 877 drives signal line 807 high, which enables a data request on line 802, and which further configures the circuit to receive DATA as discussed above. A high signal on line 802 passes through inverter 869 to control multiplexer 870 to connect Data line 801 directly to signal line 812. This direct connection provides a "pre-charge" to the latches 854, 855, which avoids a one clock long "dead spot" that otherwise would exist when receiving the first new data. Thus, the data is presented to the Asynchronous logic conversion stages of the interface as soon as it and the corresponding acknowledge signal arrive so they can be immediately utilized, if the following conversion stages are ready.

Figure 4B:
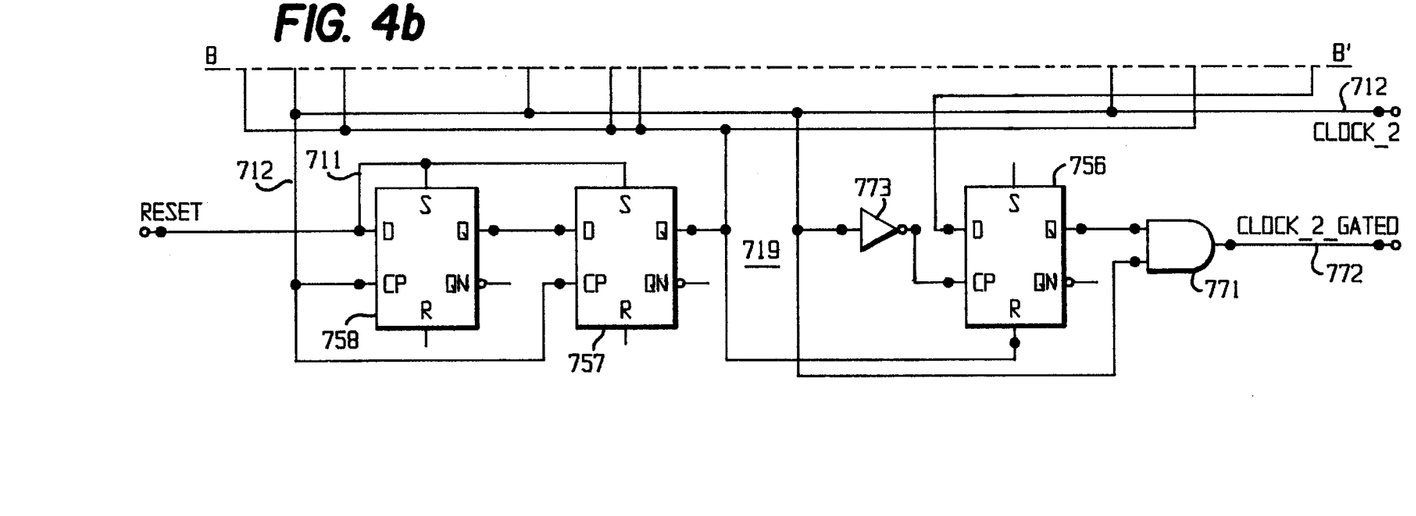
Figure 4C:
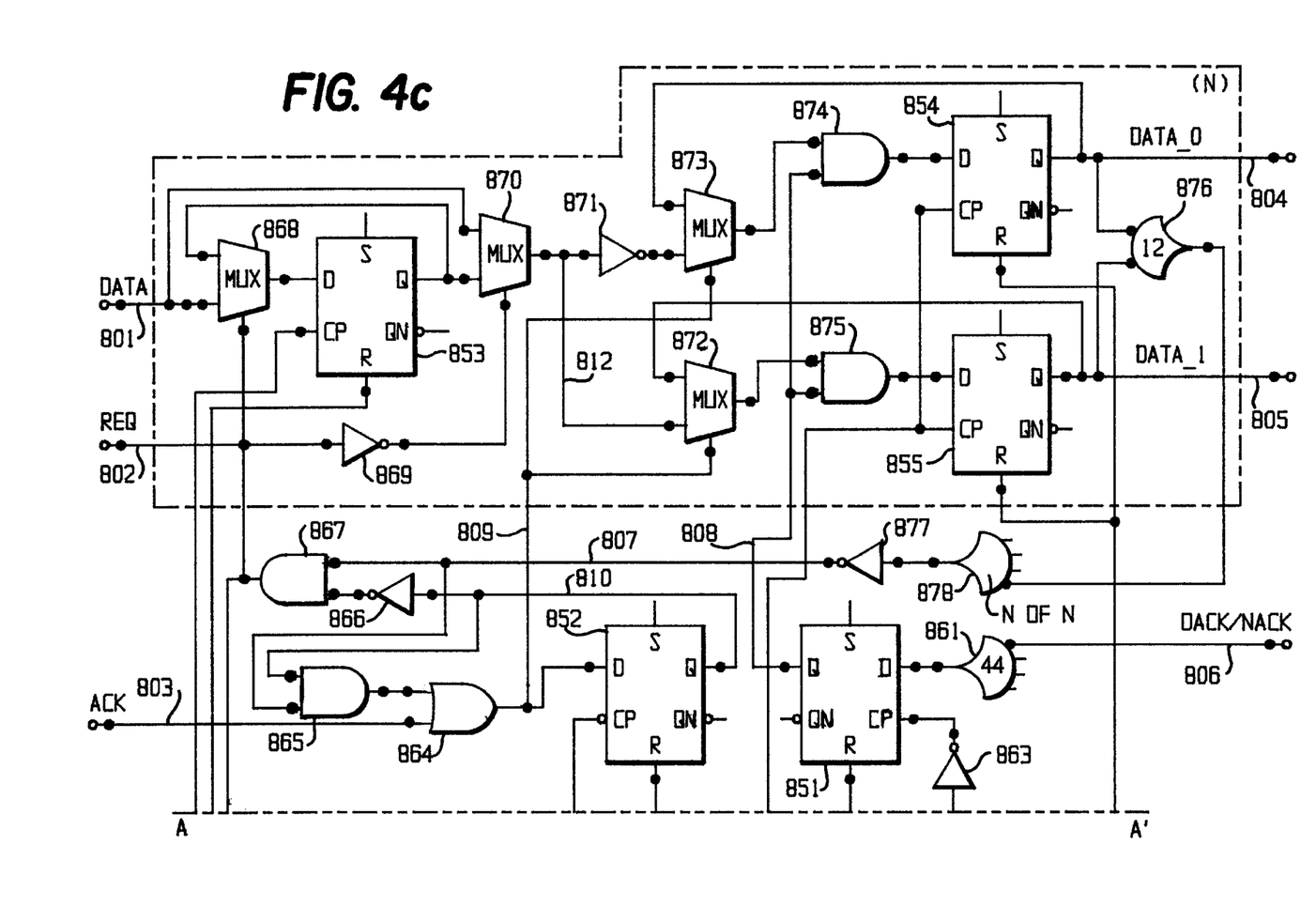
FIGS. 4c and 4d illustrates the circuit of FIG. 3b modified with gated clock and synchronous reset sub-circuits.
Figure 4D:
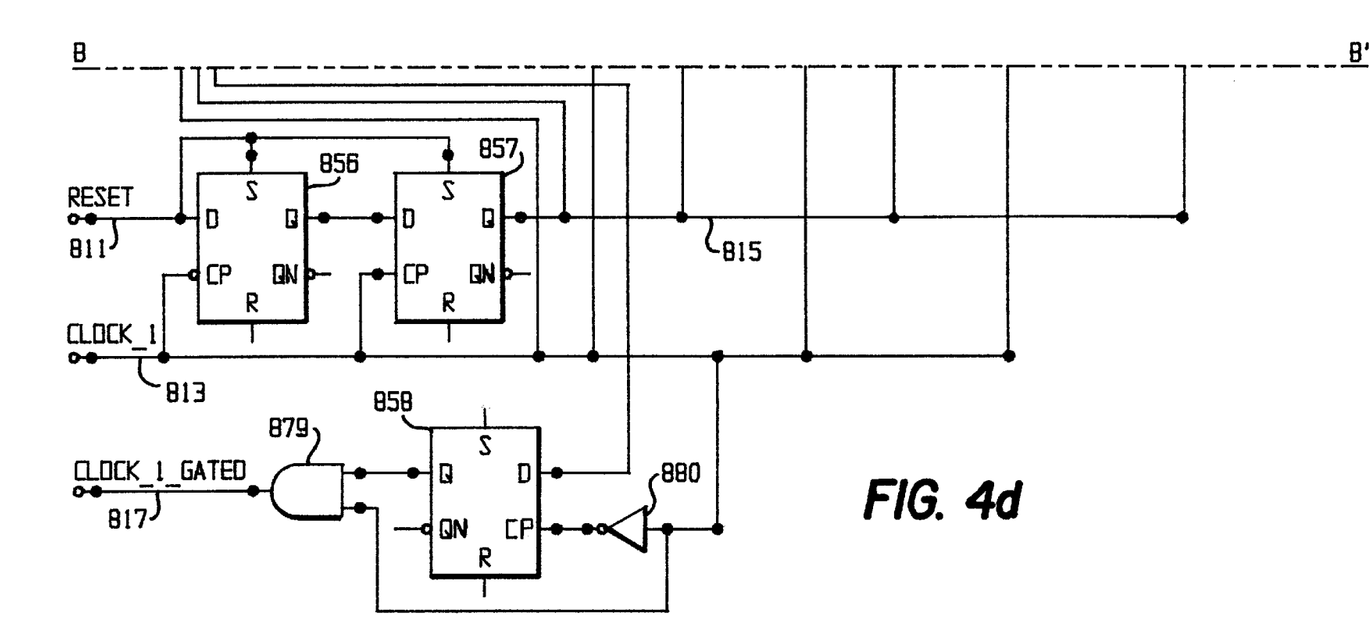

FIG. 4b illustrates the circuit of FIG. 3b but modified with: 1) a synchronous reset capability, and 2) a gated clock for use as an alternative protocol for transferring clocked data to a clocked Boolean circuit. Circuit elements that are the same in FIGS. 3b and 4b have the same reference numerals.

With regard to the synchronous reset feature, the external reset signal from line 811 passes through the data inputs of two series latches 856, 857 that are clocked by the Clock_1 signal from line 813. The external Reset line 811 also connects to the SET inputs of latches 856, 857. When the external Reset line 811 is active (high), it immediately sets both latches 856, 857, which in turn drives internal reset line 815 to clear latches 851, 852, 853, 854, and 855. When the external Reset line is low (no longer active), the previously-set latches 856, 857 maintain the internal reset line active for at least one cycle of the Clock_1 signal on line 712, which isolates any potential metastability problems associated with the asynchronous external reset. This local reset may also be used to reset the attached external circuitry.

With regard to the gated clock feature, the Clock_1 signal from signal line 813 via inverter 880 clocks the Request signal from AND gate 867 into latch 858 on the falling clock edge to avoid race conditions with the subsequent AND gate 879. The output of latch 858 in turn connects to an input of AND gate 879 which also receives Clock_1 as an input. The output of latch 858 thus gates the Clock_1 signal so that transitions of the Clock_1 signal only appear on line 817 when the request signal indicates the readiness for data transfer to latch 853.

The gated clock signal on line 817 can serve as an alternative handshaking protocol if the downstream circuitry cannot utilize the above-described request/acknowledge handshaking. The circuit provides a clock (Clock_1_ Gated) to an upstream CBL circuit only when actively transferring data. The interface circuit may stop the clock after receiving the data by dropping the Request signal line 802 LOW.

NULL Wave Induced Latency

When converting from a CBL data representation to a DRN representation, NULL waves must be inserted between DATA waves. In the FIFO architecture of FIG. 1a, separate registers hold the NULL and DATA waves, therefore, a DRN FIFO must complete two transfer cycles (one NULL and one DATA) for each transfer of data from a CBL circuit. However, the actual throughput rate of a DRN FIFO buffer will be better than half that of a clocked FIFO buffer, because the DRN FIFO completes a cycle as fast as the physical devices will permit, while a clocked FIFO will be limited to the actual clock rate. Even in systems where the data rate approaches the physical switching rate of the underlying circuitry, the asynchronous FIFO buffer of FIG. 1a will be better than one-half as fast as a clocked FIFO, because the clocked FIFO will have some inherent margin between the clock rate and the physical device switching rate. In situations where absolute speed in important, asynchronous FIFO buffers can be designed to increase throughput.

Figure 5:
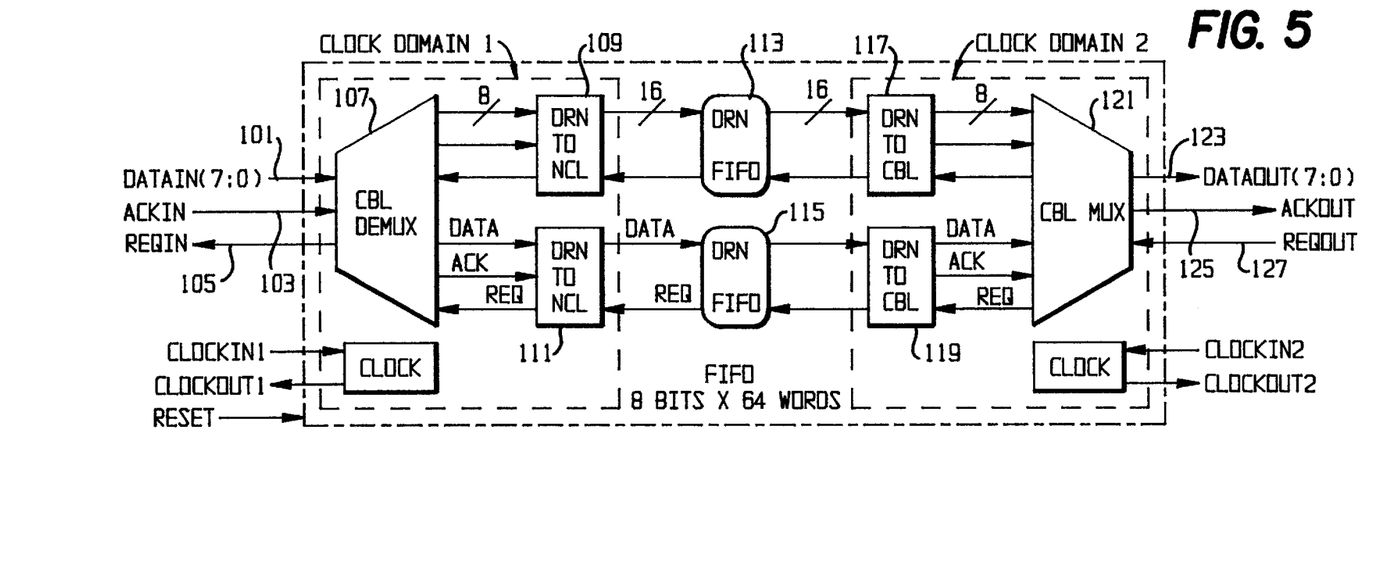
FIG. 5 illustrates a block diagram of an interface using dual asynchronous FIFO buffers.

FIG. 5 illustrates a buffer architecture that increases throughput relative to the architecture of FIG. 2. The architecture of FIG. 5 receives a clocked data stream on signal lines 101 using a protocol controlled by acknowledge and request signals on lines 103, 105. A clocked demultiplexer 107 splits the data stream in two and directs alternate data words down each of two paths to one of two CBL to DRN interfaces 109, 111. In the example shown, each interface converts eight binary data lines into sixteen dual rail signal lines. Each of two DRN FIFO buffers 113, 115 transfers one of the split data streams to one of two DRN to BCL interfaces 117, 119. The DRN to CBL interfaces remove the NULL waves and convert the sixteen dual rail signal lines to eight binary signal lines. A multiplexer 121 reassembles the two data streams back into a single data stream on lines 123 and transfers the data to a receiving circuit using acknowledge and request signals on signal lines 125, 127.

Each DRN FIFO buffer 113, 115 can be half as deep as a single FIFO buffer while still holding the same absolute amount of information because of the increased effective width. Furthermore, the reduced depth also reduces the latency of the dual-FIFO architecture to half that of a single FIFO architecture.

The CBL to DRN interface circuits 109, 111 may be the same as those illustrated in FIGS. 3b and 4b. The DRN to CBL interface circuits 117, 119 may be the same as those illustrated in FIGS. 3a and 4a. The FIFO buffers may be the same as the one illustrated in FIGS. 1a and 1b.

From the above exemplary embodiments and detailed descriptions it will be appreciated that effective developments are represented in the fields of electronics an computers. These concepts, techniques, and systems have widespread application and to those skilled in the art, numerous modifications and alternative systems will be suggested.

What is claimed is:

1. A First-In-First-Out (FIFO) circuit comprising:
   a plurality of registers that operate asynchronously aligned to define a data path from a first register of said plurality of registers to a last register of said plurality of registers;
   said first register capable of connecting to an at least partially synchronous upstream circuit; and
   said last register capable of connecting to an at least partially synchronous downstream circuit;
   each of said plurality of registers comprising:
   a plurality of first threshold gates having a first predetermined number of first inputs and a threshold value equal to said first predetermined number;
   a plurality of second threshold gates having a second predetermined number of second inputs and a threshold value less than said second predetermined number;
   a third threshold gate having a number of inputs and a threshold number equal to a number of said plurality of second threshold gates;
   each of said first plurality of threshold gates being configured to receive data on at least one of the first inputs and an acknowledge signal from a downstream circuit element on another of the first inputs, an output of each of the said first threshold gates being connected to an output of the respective asynchronous register and one of the second inputs;
   each of said second threshold gates configured to receive an output signal from at least two of said first threshold gates, an output of each of the second threshold gates being connected to said third threshold gate; and
   an output of the third threshold gate representing whether the register is ready to accept a meaningful or non-meaningful signal;
   wherein said last register will output information in a FIFO format consistent with the input of the information into said first register.

2. A First-In-First-Out (FIFO) circuit comprising:
   a plurality of registers that operate asynchronously aligned to define a data path from a first register of said plurality of registers to a last register of said plurality of registers;
   said first register capable of connecting to an at least partially synchronous upstream circuit; and said last register capable of connecting to an at least partially synchronous downstream circuit;

said upstream circuit comprising a clocked binary logic to a null convention logic interface, comprising:
- a first storage element capable of receiving clocked binary logic signals;
- a plurality of parallel second storage elements connected to the first storage element through dual data paths, one of said dual data paths including an inverter;
- logic elements in each of the dual data paths through which data from the first storage element passes in response to said first register requesting data and a control signal;
- outputs of the second storage elements being connected to a threshold gate, said control signal being at least partially derived from an output of said threshold gate; and
- output lines capable of passing asynchronous signals from said second storage elements to said first register;

wherein said last register will output information in a FIFO format consistent with the input of the information into said first register.

3. The FIFO circuit of claim 2, said first storage element comprising a latch having a clock input from an upstream clocked boolean logic circuit.

4. The FIFO circuit of claim 3, wherein the first storage element has a feedback connection to hold previously stored data until a control signal is received.

5. The FIFO circuit of claim 2, said second storage elements comprising latches having a clock input from an upstream clocked boolean logic circuit.

6. The FIFO interface circuit of claim 2, wherein the second storage elements have a feedback connection to hold previously stored data until a control signal is received.

7. The FIFO circuit of claim 6, wherein the control signal is derived from an acknowledge signal from an upstream clocked boolean logic circuit.

8. The FIFO circuit of claim 2, wherein said logic elements include at least a multiplexer, and an AND gate.

9. A First-In-First-Out (FIFO) circuit comprising:
- a plurality of registers that operate asynchronously aligned to define a data path from a first register of said plurality of registers to a last register of said plurality of registers;
- said first register capable of connecting to an at least partially synchronous upstream circuit; and
- said last register capable of connecting to an at least partially synchronous downstream circuit;
- said downstream circuit comprising a null convention logic to a clocked binary logic interface, comprising;
  - a first latch having an input that receives a signal from said last register;
  - a second latch having an output that passes said signal as a clocked binary signal; and
  - a switch, disposed between an output of said first latch and an input of said second latch, being in an open state in response to a request from another downstream circuit;
- wherein said last register will output information in a FIFO format consistent with the input of the information into said first register.

10. The FIFO circuit of claim 9, further comprising:
- said first and second latches having connected reset inputs; and
- a gated clock signal, at least partially derived from a clock signal of said another downstream circuit and an acknowledge signal representing that data is available to transfer to said another downstream circuit, comprising a clock signal having transitions of said clock signal of said another downstream circuit coincident with the acknowledge signal representing that data is available to transfer to the another downstream circuit.

11. A First-In-First-Out (FIFO) circuit comprising:
- a clocked splitting circuit capable of splitting an original data stream into a plurality of separate data streams;
- a plurality of clocked boolean logic to null convention logic converters;
- a plurality of FIFO buffers that operate asynchronously;
- a plurality of null convention logic to clocked boolean logic converters;
- a clocked combining circuit capable of combining distinct data streams into a common data stream; and
- a plurality of data paths, each defined by said splitting circuit, a respective one of said plurality of clocked boolean logic to null convention logic converters, at least one respective one of said plurality of asynchronous dual rail FIFO buffers, a respective one of said plurality of null convention logic to clocked boolean logic converters, and said synchronous combining circuit.

12. The FIFO circuit of claim 11, wherein each of said plurality of separate data streams comprises alternating sequential bits from said original data stream.

13. The FIFO circuit of claim 11, each of said plurality of FIFO buffers comprising:
- a plurality of multi-rail registers that operate asynchronously aligned to define a data path from a first register of said plurality of registers to a last register of said registers;
- said first register capable of connecting to said respective one of said plurality of clocked boolean logic to null convention logic converters; and
- said last register capable of connecting to said respective one of said plurality of null convention logic to clocked boolean logic converters;
- wherein said last register will output information in a FIFO format consistent with the input of the information into said first register.

14. A method of passing data between clocked logic circuits, comprising:
- converting synchronous boolean logic signals into asynchronous signals comprising alternating waves of meaningful and non-meaningful signals;
- propagating the asynchronous signals through a plurality of registers that operate asynchronously;
- holding, at each of the registers, one of a meaningful signal and a non-meaningful signal;
- indicating, from each of the registers, a readiness to receive a non-meaningful signal in response to the respective register holding a meaningful signal, and readiness to receive a meaningful signal in response to the respective register holding a non-meaningful signal; and
- outputting the asynchronous signals to a second interface circuit in response to a downstream boolean circuit indicating readiness to receive data.

15. A method for asynchronously transferring data in a First-In-First-Out (FIFO) format, comprising:

receiving binary logic signals timed by a first clock signal;

converting the binary logic signals into asynchronous signals in null convention logic format interspersed with NULL levels;

storing the asynchronous signals in FIFO format; and converting the asynchronous signals in FIFO format into binary logic signals in FIFO format timed by a second clock signal.

16. A method of converting a data signal of a first clock domain to a second clocked signal of a second clock domain, comprising:

receiving a first clocked data stream;

splitting the first clocked data stream into a plurality of first data substreams;

converting each first data substream to a respective asynchronous signal;

storing each respective asynchronous signal into a respective asynchronous FIFO buffer;

converting each respective asynchronous signal into a respective second data substream of a second clock domain; and combining each of said second data substreams to form a second clocked data stream.

* * * * *